United States Patent
Kwak

(10) Patent No.: US 6,839,430 B2
(45) Date of Patent: Jan. 4, 2005

(54) FRONT-COVER FOR COMMUNICATION EQUIPMENT AND METHOD FOR MANUFACTURING THE FRONT-COVER

(75) Inventor: Chul Ki Kwak, Seoul (KR)

(73) Assignee: Mosen Co., Ltd. (KR)

( * ) Notice: Subject to any disclaimer, the term of this patent is extended or adjusted under 35 U.S.C. 154(b) by 409 days.

(21) Appl. No.: 09/809,120

(22) Filed: Mar. 15, 2001

(65) Prior Publication Data
US 2001/0022840 A1 Sep. 20, 2001

(30) Foreign Application Priority Data
Mar. 16, 2000 (KR) .......................... 2000-13253

(51) Int. Cl.[7] .............................................. H04M 1/00
(52) U.S. Cl. ........................ 379/433.01; 379/433.07; 379/368
(58) Field of Search ...................... 379/433.01, 433.07, 379/433.11, 368; 455/347, 90.3, 575.1

(56) References Cited

U.S. PATENT DOCUMENTS 4,773,090 A    9/1988  Goatman
4,817,138 A    3/1989  Thomke et al.
5,386,084 A *  1/1995  Risko .......................... 455/347
6,504,928 B1 * 1/2003  Toyooka ................ 379/433.01

FOREIGN PATENT DOCUMENTS

JP           11-341122        12/1999

* cited by examiner

Primary Examiner—Jack Chiang
(74) Attorney, Agent, or Firm—Cantor Colburn LLP

(57) ABSTRACT

A front cover for a communication equipment is described which comprises an external pad having a transparent display window placing portion and button placing portions which are projected outwardly from an outer surface of the external pad; a housing which is integrally placed at an inner surface of the external pad and has a transparent display window through hole corresponding to the transparent display window placing portion and button through holes corresponding to the button placing portions; a transparent display window which is integrally placed at the transparent display window placing portion of the external pad; and buttons which are integrally placed at the button placing portions of the external pad. The transparent display window, the housing and the buttons can be molded on the inner surface of the external pad by injecting synthetic resins onto each of placing portions thereof.

8 Claims, 4 Drawing Sheets

FRONT-COVER FOR COMMUNICATION EQUIPMENT AND METHOD FOR MANUFACTURING THE FRONT-COVER

BACKGROUND OF THE INVENTION

1. Field of the Invention

The present invention relates to a front cover for a communication equipment, and in particular, to a front cover for a communication equipment having an external pad to prevent invasion of water or impurities thereinto. Also, the present invention relates to a method for manufacturing such a front-cover for a communication equipment.

2. Description of the Related Art

With a rapid development of a communication technique, the communication equipment is widely used. The communication equipment that is being generally used is portable communication equipment such as a portable phone and a PCS (personal communication system).

Such a communication equipment has a front cover as shown in FIG. 1. The front cover is formed by combining a front housing 1 having button through holes for numeral, character or function buttons and a transparent display window placing portion, a keypad 3 having a plurality of buttons, and a transparent display window 2 having a transparent window. The outer surface of the front cover can be decorated by printing pictures or attaching a sticker if a user needs.

To prevent water or particles from going through the combining area of the components, the front cover for a portable communication equipment manufactured as described above has a packing in the combining area. However, with the transformation of the packing, there exists a problem that water or particles may go through the combining area of the components.

Further, since the front cover is manufactured by combining a plurality of components, it requires a complicated process as well as lots of instruments and labor, thus deteriorating the productivity.

SUMMARY OF THE INVENTION

It is, therefore, an object of the present invention to provide a front cover for a communication equipment which can be easily manufactured and can prevent invasion of water or impurity into the inside thereof.

It is another object of the present invention to provide a method for manufacturing a front cover for a communication equipment.

To achieve the above objects, there is provided a front cover for a communication equipment having an external pad. The front cover comprises an external pad having a transparent display window placing portion and button placing portions which are projected outwardly from an outer surface of the external pad; a housing which is integrally placed at an inner surface of the external pad and has a transparent display window through hole corresponding to the transparent display window placing portion and button through holes corresponding to the button placing portions; a transparent display window which is integrally placed at the transparent display window placing portion of the external pad; and buttons which are integrally placed at the button placing portions of the external pad. The external pad also includes a groove formed around corresponding one of the button placing portions. The groove is disposed to fill a gap between edges of corresponding one of the buttons and corresponding one of the button through holes.

Also, there is provided a method for manufacturing a front cover for a communication equipment. The method comprises printing numbers, characters or figures on a thin film; forming an external pad of the thin film to have a transparent display window placing portion and button placing portions, corresponding to the front cover; inserting the external pad into a mold; placing a transparent display window and a housing integrally on an inner surface of the external pad; and placing buttons on the button placing portions of the external pad.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings.

Figure 1:
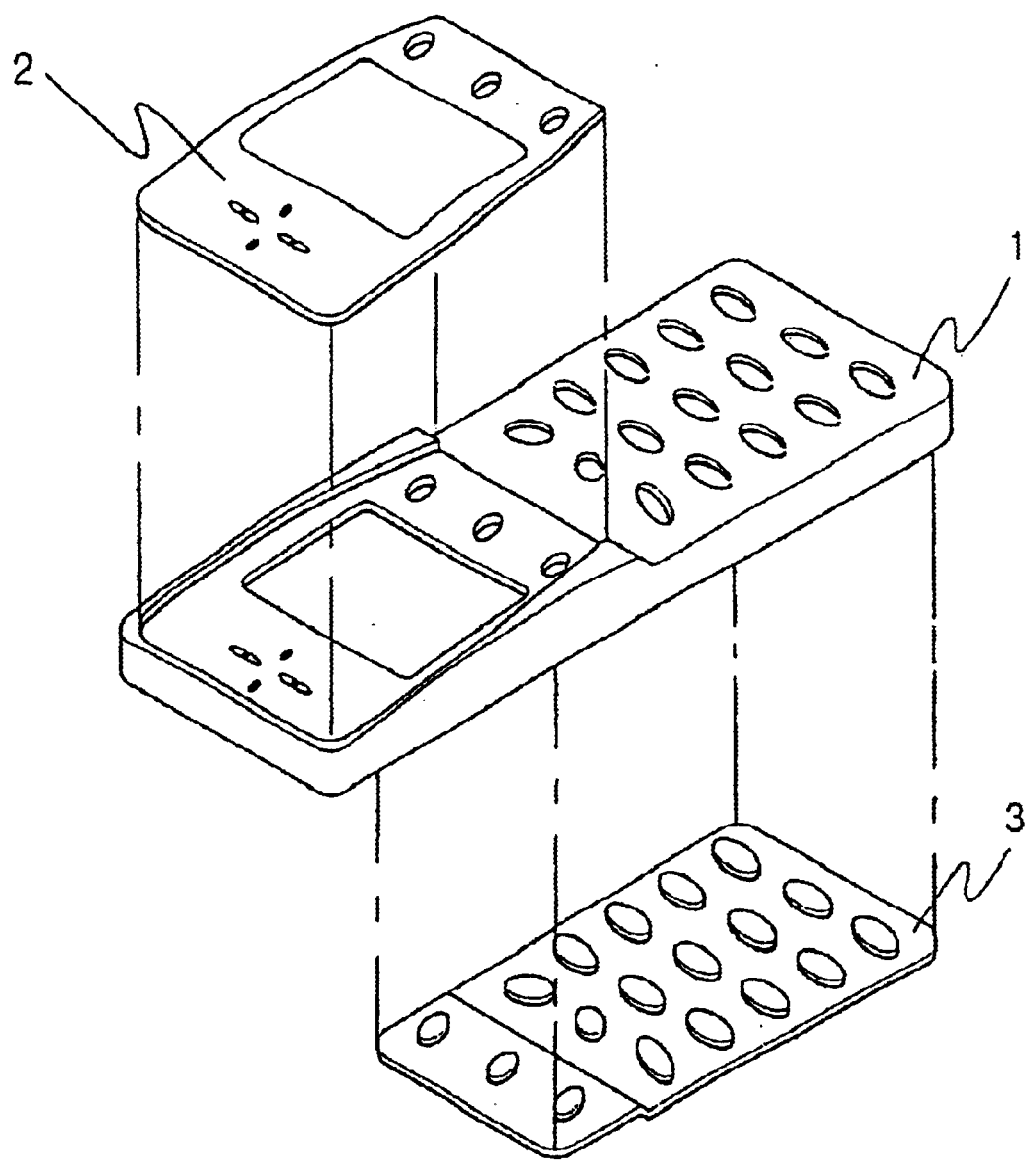
FIG. 1 is a perspective view showing an example of a front cover for communication equipment according to a prior art.
Figure 2:
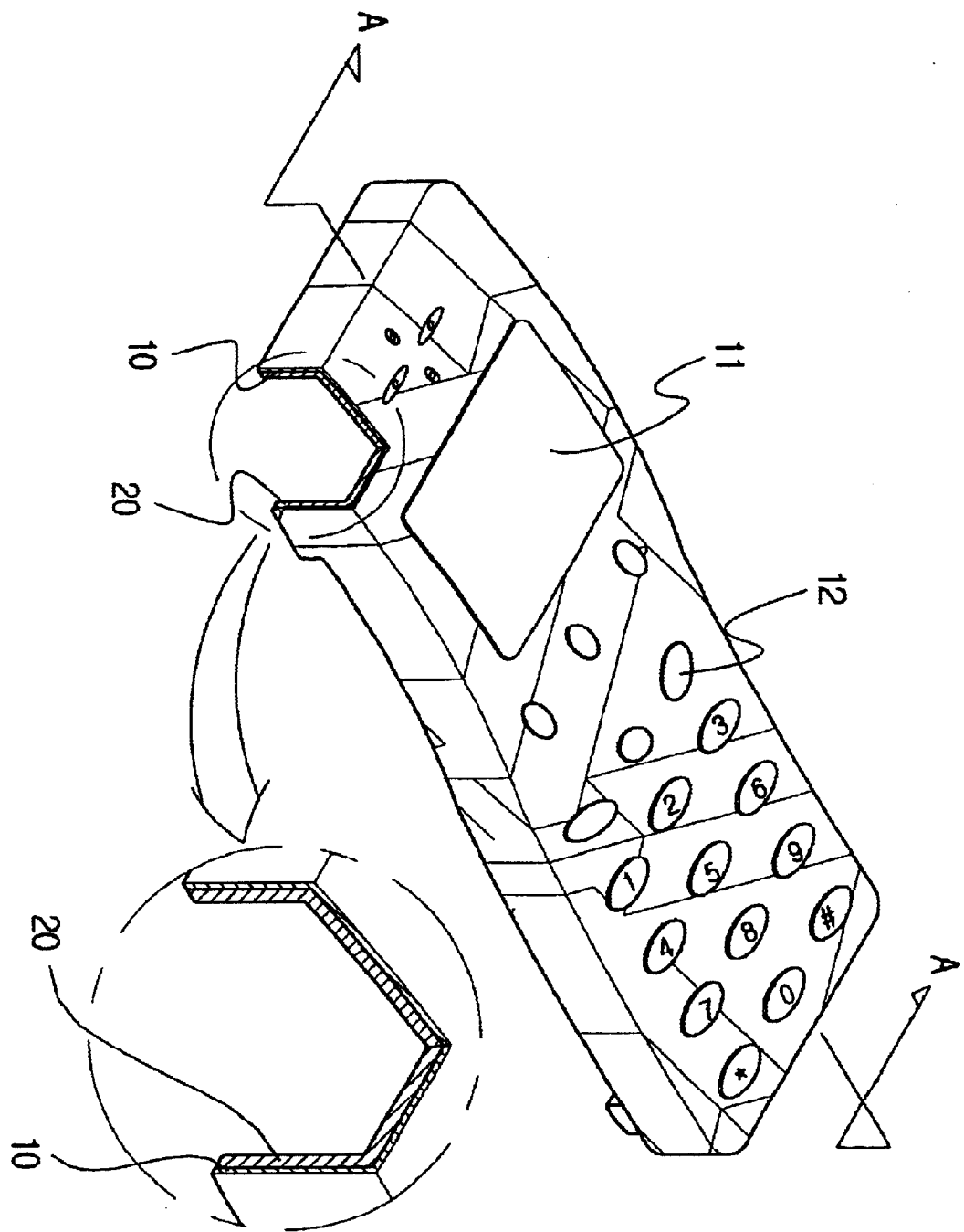
FIG. 2 is a partially sectional perspective view showing an embodiment of a front cover for communication equipment having a keypad united therein according to the present invention.
Figure 3:
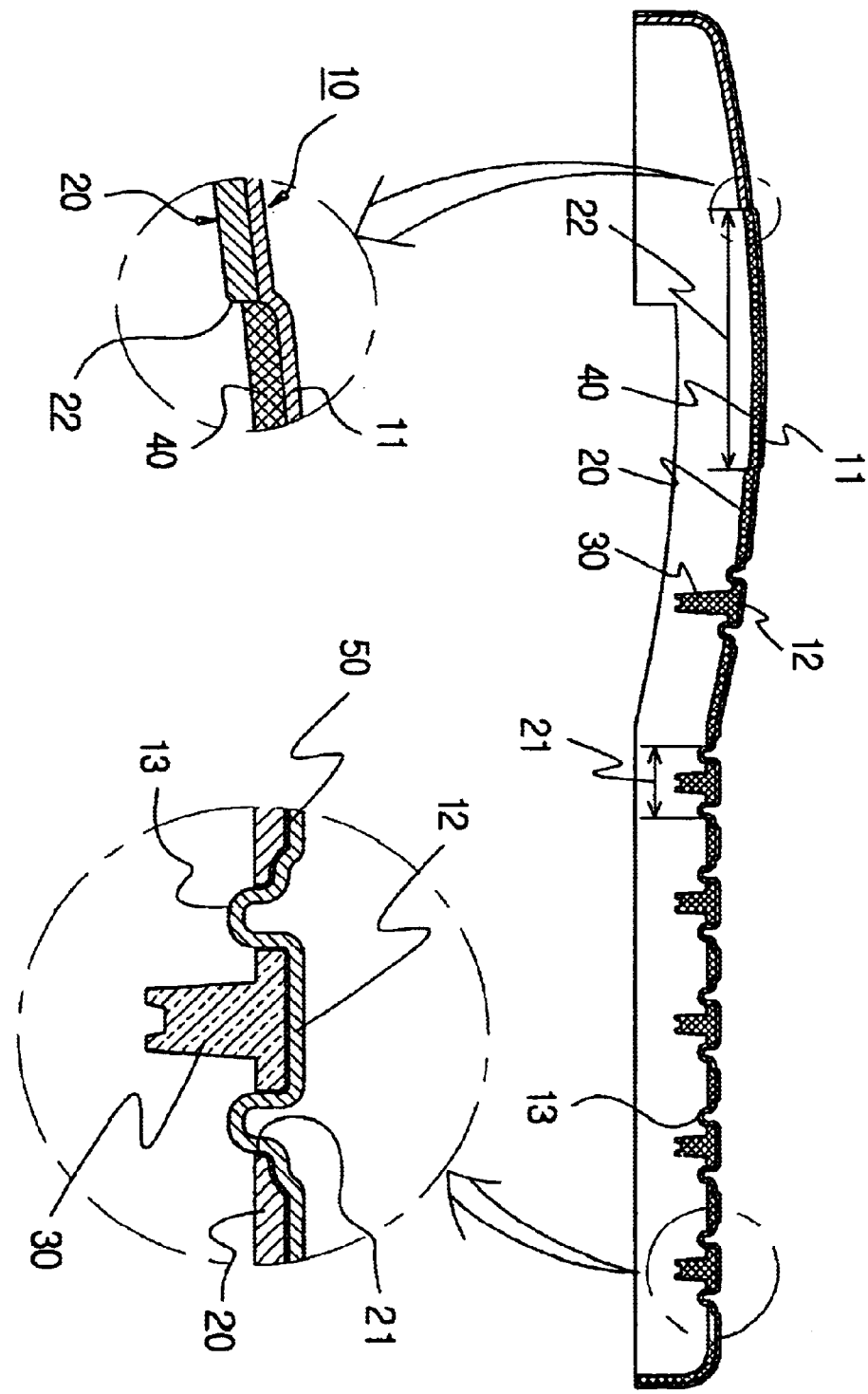
FIG. 3 is a cross sectional view taken along the line A-A of FIG. 2.

As shown in the FIGS. 2 and 3, according to the preferred embodiment of the present invention, the front cover for a communication equipment comprises an external pad 10 to be placed at the most outer surface, a housing 20 for maintaining a shape, buttons 30 for inputting information and a transparent display window 40 for displaying information.

Preferably, the external pad is a seamless one-piece form. The external pad 10 is made of a thin film, preferably, of a synthetic resin, more preferably, of a transparent synthetic resin. Most preferably, the synthetic resin has an elasticity enough to provide the external pad with a certain degree of impact absorbance. Any synthetic resin generally available in the art can be used.

Figures, pictures or characters are preferably printed on one side of a thin film. Button-placing portions 12 in which buttons are placed and a transparent display window-placing portion 11 in which a transparent display window is placed are folded and projected from an outer surface of the external pad. The transparent display window placing portion 11 is transparent so that a user can see through the information displayed on a display unit of the communication equipment. Numbers for inputting telephone number, characters for inputting character information or figures for indicating functions are printed in the button placing portions 12. The remaining portions other than the button-placing portions 12 and the transparent display window-placing portion 11 can be printed with pictures or figures or can be colored according to the taste of a user.

A groove 13 is formed around the button placing portions 12 with a predetermined gap so that the buttons 30 integrally placed at the inner surface of the external pad 10 can be smoothly moved up and down. The groove includes side walls and a bottom. The side walls are in contact with the edges of the corresponding button and the corresponding button through hole, respectively, and the bottom is protruded inwardly between the edges, for example, beyond the inner face of the housing. However, the transparent display window 40 integrally placed at the display placing portion 11 is not moved but fixed by forming only an outward or inward folding line without any groove.

The transparent display window 40 and the buttons 30 are placed at the transparent display window-placing portion 11 and the button-placing portions 12, respectively. The transparent display window 40 is preferably of a plate shape having a predetermined thickness, and can be formed by injection molding synthetic resins on the transparent display window-placing portion 11. The transparent display window 40 is preferably transparent so that a user can check the information displayed on a display unit of the communication equipment. The buttons 30 which push the electric contact points formed at a circuit substrate of the communication equipment can be formed by injecting synthetic resins on the button placing portions 12.

The external pad 10 is made of a thin film or plate as described above and the housing 20 is placed at the inner surface thereof, i.e., at the surface facing the interior of the communication equipment to maintain the shape of the external pad 10.

A transparent display window through hole 22 through which the transparent display window 40 passes and button through holes 21 through which the buttons 30 pass are formed at the housing 20. The button through hole 21 is formed to have a wider width than the button 30 so that the groove 13 formed at the external pad 10 can be inserted together with the button 30.

The numbers, characters or figures are preferably formed on the inner surface of the external pad 10, i.e., on the surface that contacts with the housing 20, so that they cannot be erased by the repeated contact such as the frequent pushing of the button.

Figure 4:
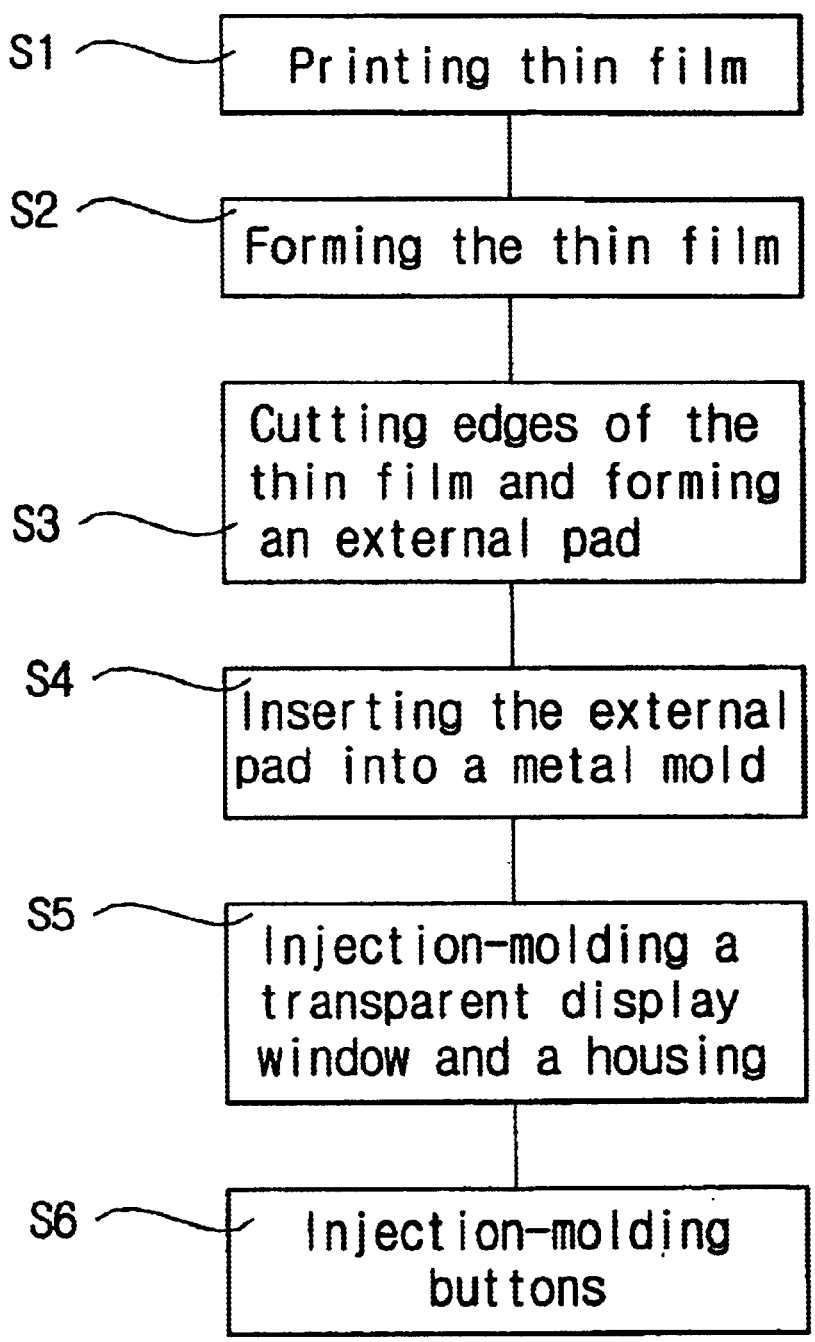
FIG. 4 is a flow chart to explain one embodiment of manufacturing process of a front cover for a communication equipment according to the present invention.

Method for manufacturing such a front cover for a communication equipment as described above will be described herein below with reference to FIG. 4 and FIGS. 2 and 3.

Preferably, a transparent thin film made of synthetic resin is provided in a one-piece form, and numbers, characters or figures are printed on the thin film (S1). Preferably, such numbers, characters or figures are printed on an inner surface of the film. The printed thin film is inserted into a mold corresponding to the front cover for the communication equipment, is pressed so that a transparent display window placing portion and button placing portions are formed to the thin film (S2). The thin film is taken out of the mold and the edges of the thin film are cut and finished to form the external pad 10 (S3). The external pad 10 is inserted and placed into a mold (S4), and the mold is preferably made of a metal. Then the transparent display window 40 and the housing 20 are respectively placed on an inner surface of the external pad 10 by injecting synthetic resins to the transparent display window placing portion 12 and the inner surface of the external pad 10 using a injection molding machine (S5). Also, each of buttons 30 is placed on the inner surface of the external pad 10 by injecting synthetic resins to the button placing portions 11 (S6). Thereafter, of course, processing steps such as coating, drying and inspecting are applied on the external pad 10 in order to obtain a finished front cover.

The transparent display window 40, the housing 20 and the buttons 30 can be formed in several ways. For example, after the transparent display window 40 is formed, the housing 30 is formed by injection molding so that the synthetic resin for forming housing 20 is prevented from flowing into the transparent display window 40. Then, the buttons 30 are formed by injection molding through each of injection gates of an injection molding machine. Alternatively, the housing 20 is molded and then the transparent display window 40 is molded. This type of injection molding is called as "double injection molding". Alternatively, the transparent display window 40 and the housing 20 are molded at the same time and then the buttons 30 are molded. This type of injection molding is called as "triple injection molding".

Preferably, the transparent display window 40 is molded on the transparent display window placing portion 11, each of buttons 30 is molded on the button placing portions 12, and the housing 20 is molded on the inner surface other than the transparent display window and the button placing portions 11 and 12 of the external pad 10.

Alternatively, the housing is pre-made and attached on the inner surface of the external pad by an adhesive.

According to the front cover for the communication equipment having an external pad of the present invention, since the external pad covers the front surface of the communication equipment and there is no through hole on the front cover, it is possible to prevent water or particles from going into the communication equipment. In addition, pictures or figures printed on the inner surface of the external pad provide the communication equipment with a smooth outer surface. And, the lifetime of the communication equipment is extended because the external pad can also function as a protect layer.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A front cover for communication equipment comprising:
    an external pad having a transparent display window placing portion and button placing portions which are projected outwardly from an outer surface of the external pad;
    a housing which is integrally placed at an inner surface of the external pad and has a transparent display window through hole corresponding to the transparent display window placing portion and button through holes corresponding to the button placing portions;
    a transparent display window which is integrally placed at the transparent display window placing portion of the external pad; and
    buttons which are integrally placed at the button placing portions of the external pad, the buttons being disposed to pass through the button through holes of the housing,
    wherein the external pad includes a groove formed around corresponding one of the button placing portions, the groove being disposed to fill a gap between edges of corresponding one of the buttons and corresponding one of the button through holes.

2. The front cover as claimed in claim 1, wherein the external pad is of a seamless one-piece form.

3. The front cover as claimed in claim 1, wherein the external pad is made of a thin film.

4. The front cover as claimed in claim 3, wherein the external pad is made of a transparent synthetic resin.

5. The front cover as claimed in claim 3, wherein the external pad is made of an elastic synthetic resin.

6. The front cover as claimed in claim 1, wherein the external pad includes numbers, characters or figures printed on the inner surface of the button placing portions.

7. The front cover as claimed in claim 1, wherein the groove includes side walls and a bottom, the side walls being in contact with the edges of the corresponding button and the corresponding button through hole, respectively, the bottom being protruded inwardly between the edges.

8. The front cover as claimed in claim 7, wherein the bottom is protruded inwardly beyond an inner face of the housing.

* * * * *